United States Patent [19]

Hausammann

[11] Patent Number: 5,303,665
[45] Date of Patent: Apr. 19, 1994

[54] SEWING MACHINE

[75] Inventor: Erich Hausammann, Ermatingen, Switzerland

[73] Assignee: Fritz Gegauf AG Bernina-Nahmaschinenfabrik, Steckborn, Switzerland

[21] Appl. No.: 654,593

[22] Filed: Feb. 13, 1991

[30] Foreign Application Priority Data

Aug. 27, 1990 [CH] Switzerland .................. 02 782/90-7

[51] Int. Cl.⁵ .................................................. D05B 3/02
[52] U.S. Cl. ........................................ 112/445; 112/458
[58] Field of Search .............. 112/445, 458, 453, 454, 112/456, 457, 121.11, 121.12, 103

[56] References Cited

U.S. PATENT DOCUMENTS

| | | | |
|---|---|---|---|
| 4,620,496 | 11/1986 | Hanyu | 112/445 |
| 4,660,488 | 4/1987 | Hanyu et al. | 112/458 X |
| 4,860,678 | 8/1989 | Skogward | 112/458 X |
| 4,942,836 | 7/1990 | Sano et al. | 112/445 |
| 5,044,291 | 9/1991 | Kobayashi et al. | 112/445 |
| 5,097,779 | 3/1992 | Ishikawa et al. | 112/445 |
| 3,872,8080 | 3/1975 | Wurst | 112/458 |

*Primary Examiner*—Peter Nerbun
*Attorney, Agent, or Firm*—Richard Linn

[57] ABSTRACT

An electro-optical display serves for the display of basic types of stitch patterns or individual stitch patterns, e.g. zig-zag sewing, buttonholing, alphanumeric characters and the like. A cursor 13 can be moved to the displayed stitch pattern groups by means of a control device, and a menu comprising different stitch patterns of the selected stitch pattern group can then be selected and displayed by pressing an OK button. The particular desired stitch pattern group or the stitch pattern can then be selected from this menu or another menu which is displayed when an advance command is given. This hierarchical, stepwise display and selection of a determined stitch pattern group or an individual stitch pattern substantially simplifies and accelerates the selection from a great number of available stitch types or patterns.

12 Claims, 3 Drawing Sheets

SEWING MACHINE

The present invention refers to a sewing machine having an electro-optical display for displaying stitch patterns and/or parameters stored in a memory, and having means for selecting displayed stitch patterns and/or parameters. Such a sewing machine is known from U.S. Pat. No. 4,860,678. The continuing miniaturization of electronic components, in particular of electronic memories, allows fixed storage and individual recall of an increasing number of preset stitch patterns in the space available in a sewing machine. Correspondingly, however, it is increasingly difficult and time-consuming to display a determined, desired stitch pattern on the screen and to select and activate it in order to perform the sewing operation.

It is the object of the present invention to simplify and facilitate said selection. This object is attained by means of a sewing machine wherein menus of stitch pattern groups and stitch patterns are hierarchically stored, recalled, and respectively displayed, means for the selection of pattern groups and stitch patterns being provided, and wherein stitch pattern menus corresponding to the selected stitch pattern group are storable, displayable and selectable. Due to this new sewing machine design it is now possible first to display a menu of stitch pattern groups on the screen, to thus select a determined pattern group, and to then represent the individual stitch patterns of said pattern group on the display and select them accordingly. This hierarchical procedure for finding and selecting a determined stitch pattern or a determined sewing operation substantially facilitates and accelerates the selection process.

Further features and advantages of the invention appear in the dependent claims and the following description.

An embodiment of the sewing machine of the invention is now explained with reference to the drawings.

Figure 1:
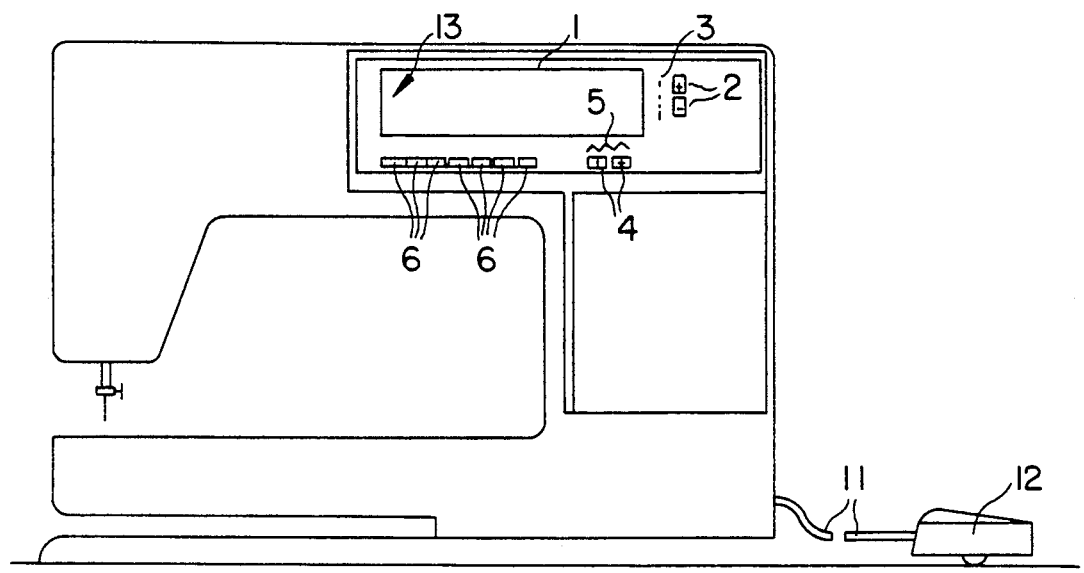
FIG. 1 is a side view of the sewing machine comprising a separate control device.

The sewing machine, a schematical side view of which is shown in FIG. 1, comprises an electro-optical display 1 having e.g. 64×256 pixels. On the side of said display, two buttons 2 for adjustment of the stitch length are provided, which is indicated by a nearby symbol 3. Corresponding buttons 4 for the adjustment of the stitch width are provided on the right below the display 1, which is indicated by a symbol 5 as well. Selecting buttons 6 for the preselection of particularly frequent sewing operations are provided on the left below display 1. The machine further comprises a confirmation or OK button 7 as well as a cancellation or CLEAR button 8. Adjustment of the stitch length and the stitch width might as well be effected by means of adjusting knobs, thumb wheels, adjusting slides, etc., which would be provided instead of the pairs of buttons 2 and 4.

A control device, e.g. a so-called "mouse" or rotating ball or another control device such as a control stick (Joystick), is connected to the machine by a cable 11. An image element or cursor 13 may be moved to any point of the display 1 by means of said control device.

Figure 2:
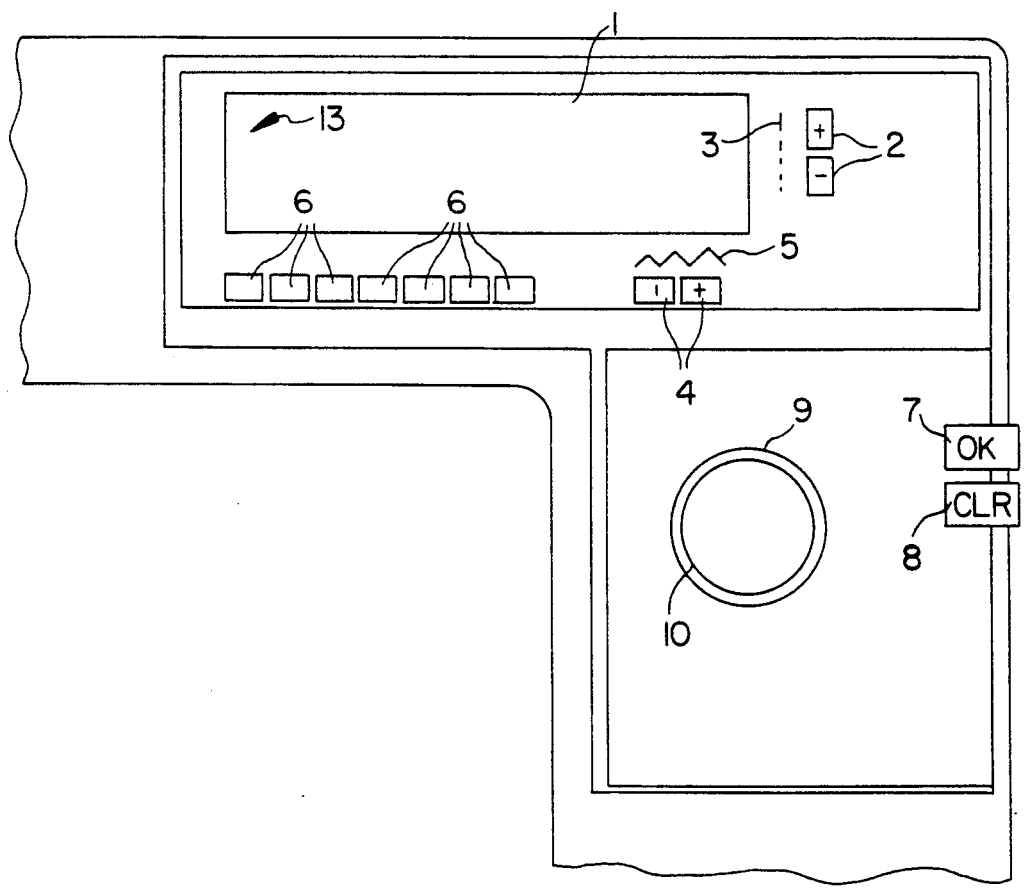
FIG. 2 shows, on an enlarged scale, the display and the operating panel of the sewing machine as well as a rotating ball provided on the machine.

It would be particularly advantageous to provide a rotating ball (Track Ball) or a control stick (Joystick) directly on the front side of the machine. For example, a rotating ball 9/10 (FIG. 2) may be integrated in the machine together with the OK button 7 and the CLEAR BUTTON 8 as an operating unit and ergonomically disposed in such a manner as to allow an optimal minimal fatigue operation of the machine with the menu-controlled stitch pattern selection.

Figure 3:
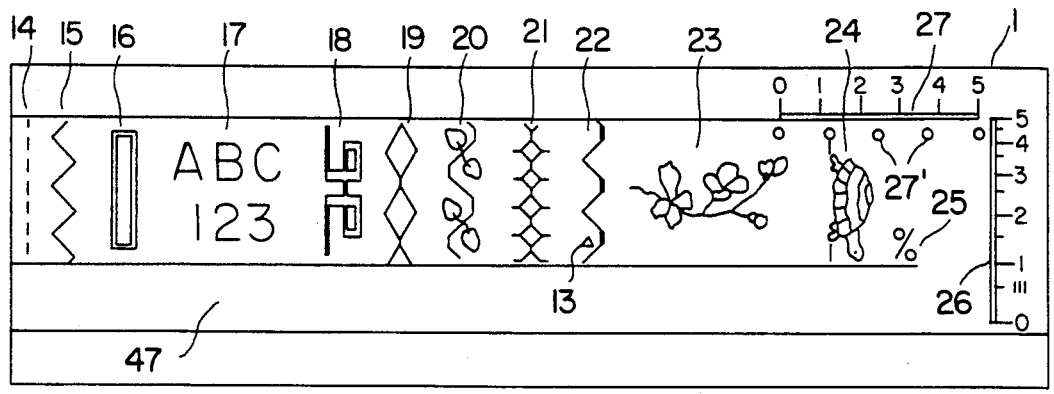
FIGS. 3 to 7 show a number of typical examples for displays which can be brought to the screen.
Figure 4:
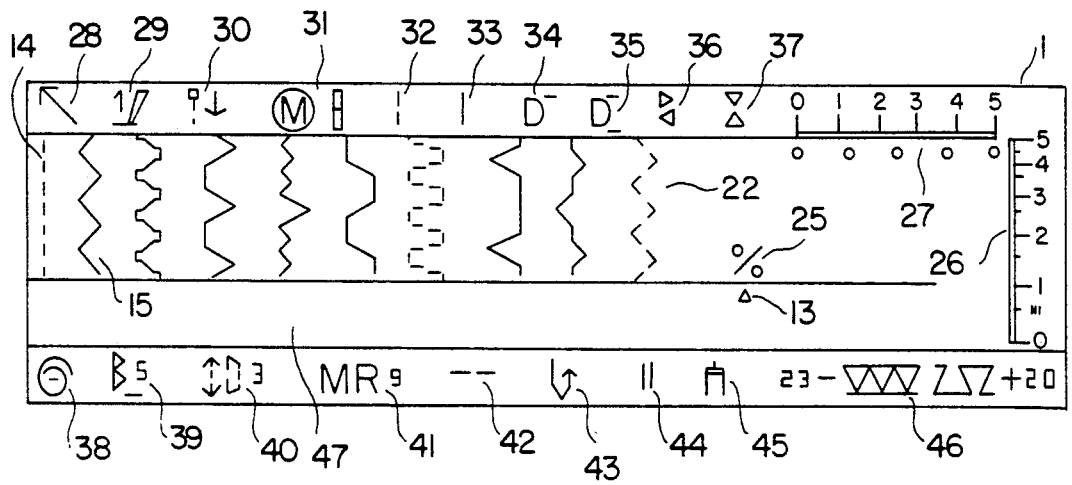
Figure 5:
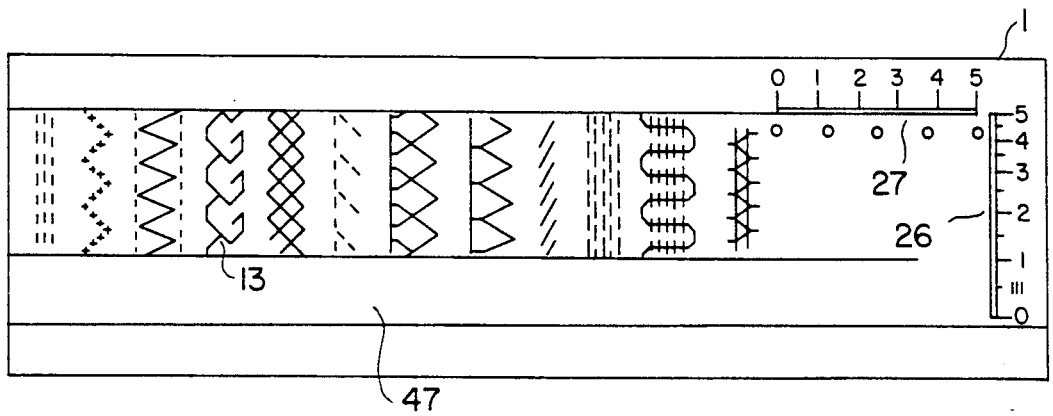

When the machine is switched on, a menu of certain basic stitch pattern groups representing types of stitch patterns is automatically displayed on the screen 1, as represented in FIG. 3. There are such pattern groups as the straight stitch 14, zig-zag sewing 15, buttonholing 16, alphanumeric characters 17, geometric ornaments 18, compact stitches 19, floral stitches (leaf and flower motives) 20, hollow seam stitches 21, utility stitches 22, large ornaments 23 and FIGS. 24. This classification of stitch types or pattern types is not final or obligatory, and a second menu may be stored and displayed when selected by moving the cursor to symbol 25 and pressing the OK button, in which case the next corresponding menu, i.e. another menu of basic stitch pattern groups or pattern types is displayed. If the desired basic pattern group or type is included in the displayed menu, the cursor 13 is moved into the area of this pattern group, and the OK button is pressed again. Thereby, another menu of special stitch patterns is now displayed which is included within the previously selected stitch pattern group. It is assumed in the drawing that the cursor 13 has been placed upon stitch pattern group 22 of the menu according to FIG. 3 and that this group has been selected, in which case the menu according to FIG. 4 appears. In the present case, it is assumed that the straight stitch 14 and the zig-zag stitch 15 are again displayed together with different other stitch patterns. The cursor 13 can now be moved to the desired stitch pattern, and the latter can be selected by pressing OK button 7. Besides the stitch patterns, this menu now also displays the stitch length and stitch width by means of two bar displays 26 and 27. Normally, the optimum values for the stitch length and width as well as the stitch field position, if applicable, are preprogrammed for every stitch pattern, but these values can also be modified at will by means of buttons 2 and 4. Light dots 27' below the bar display 27 serve to indicate selected the needle position, the selection being effected by moving the cursor to the position corresponding to the desired dot 27' and storing the corresponding value for subsequent control of the machine by pressing OK button 7. Further symbols are displayed at the top and at the bottom of the screen, where the cursor 13 can be moved in order to attribute certain functions to the selected stitch pattern group or stitch pattern. A symbol 28 stands for return to the first menu, a symbol 29 for pressure foot indication, a symbol 30 for needle stop at the bottom, a symbol 31 serves for the selection of the motor speed. For example, the motor may automatically be operated at half-speed when this symbol is activated. A symbol 32 stands for long stitch, 33 for basting stitch, 34 for pattern start, 35 for pattern end, 36 for lateral mirror-image, 37 for mirror-image in the sewing direction, 38 for under-thread control, 39 for single pattern fixing, 40 for pattern extension, 41 for memory program, 42 for memory program interrupt, 43 for backward stitching, 44 for double number of stitches, 45 for double needle limitation, and 46 for balance −/balance +. Symbols 29 to 46 appear continuously, but they are omitted in FIGS. 5 to 7 for the sake of simplicity. If the desired stitch pattern is not found on the menu according to FIG. 4, the cursor can again be moved to symbol 25 which means advance, and the next menu, e.g. the one according to FIG. 5, can be displayed by actuating OK button 7. As described, the cursor 13 is again moved to a certain pattern, and the latter is selected and activated by pressing OK button 7.

Figure 6:
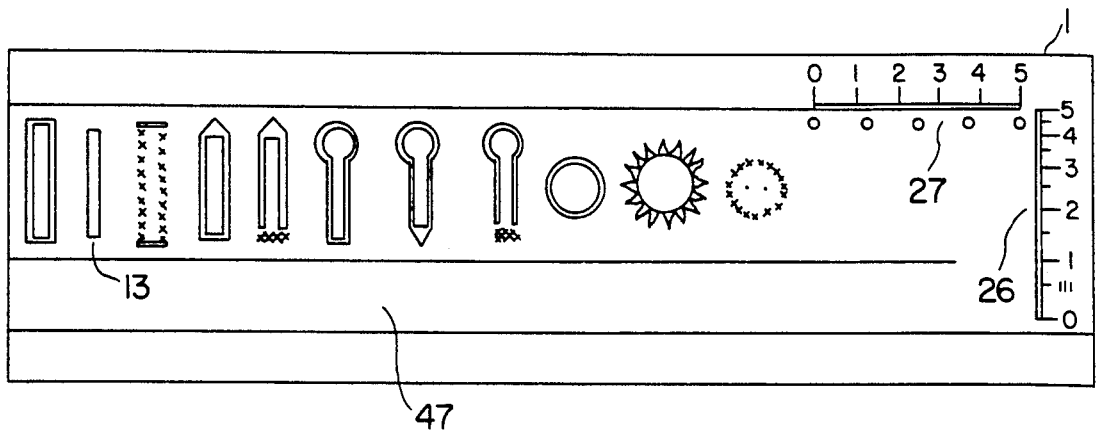

If cursor 13 is moved to symbol 16 (buttonholing) on the menu according to FIG. 3, which displays the stitch pattern groups, and OK button 7 is pressed, the menu according to FIG. 6 comprising different types of buttonholes will be displayed, and the cursor can now be moved to the desired symbol in order to select this given stitch pattern and afterwards to control the sewing machine accordingly.

Figure 7:
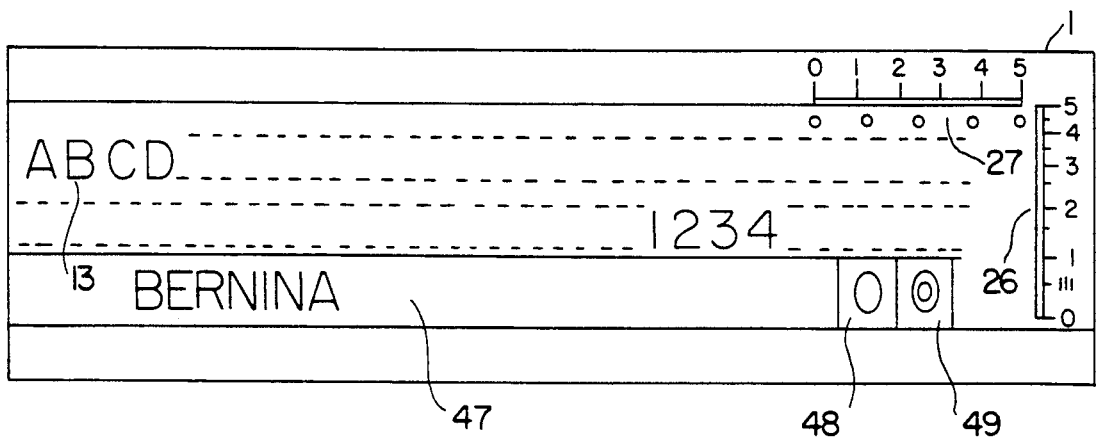
Figure 8:
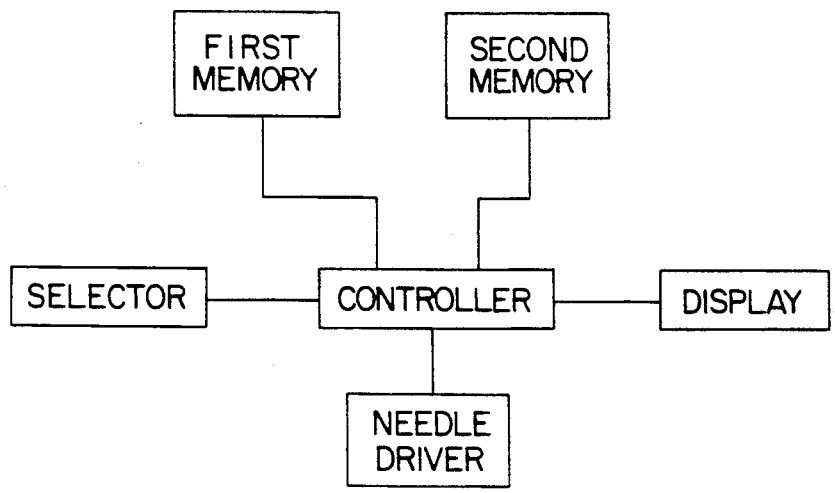
FIG. 8 shows a control circuit for the sewing machine and display.

If alphanumeric characters are chosen from the menu according to FIG. 3, the menu according to FIG. 7 will appear. For simplicity, this figure only shows a few letters of the alphabet and some numbers. However, additional characters or symbols and different letter styles can be available as models, each character being selectable by means of cursor 13. Words and multi-digit numbers can thus be formed if the corresponding characters are consecutively selected. All the menus are displayed in such a manner that a free space 47 is left below the symbols themselves, and in the alphanumeric character display according to FIG. 7 this space serves to display the consecutively selected stitch patterns as a combination, e.g. the word BERNINA, for verification. Moreover, the stitch type (straight stitch or zig-zag stitch) of the corresponding patterns can be preselected by activating the symbols 48 or 49.

In the hitherto described embodiment it is assumed that even the most frequent stitch patterns have to be selected and programmed voluntarily. However, the microprocessor is advantageously programmed in such a manner that the most commonly used stitch patterns are displayed in the first menu, the machine automatically performing a straight stitch of predetermined length in the absence of a specific pattern selection. In this case, the buttons 6 for the preselection of the most common stitches may be omitted. Alternatively, as determined, particularly frequent stitch patterns may be activated automatically in each displayed menu, all the other patterns having to be selected in the above-described manner. It is also advantageous to provide a separate menu for the special utilities 28 to 46 instead of displaying them in every stitch pattern menu. However, it is particularly advantageous to display as many simultaneous pieces for information as possible and to allow their consecutive selection without the need for switching to another menu. For better control of the process, the specific selected pattern, and its respectively selected utilities may be highlighted e.g. by blinking after their selection and confirmation in order to continuously ascertain which parameters are effective for the sewing operation until it is started.

Other variations are advantageous. For example, the stitch length and width could also be preselected by moving the cursor 13 to the location on the bar displays 26 and 27 or on the assigned scales which corresponds to the desired size and storing the selected value by pressing OK button 7. The basic stitch types which are displayed in the first menu according to FIG. 3 could at least partially be identified by displayed words as well.

Further it would be advantageous to provide a first menu which displays the particular stitch patterns most commonly used by the user of the sewing machine. These stitch patterns could be transferred from the corresponding menus to the individual one at any time, preferably as the user becomes familiar with the possible applications of the machine and his or her personal needs.

I claim:

1. A sewing machine comprising a memory, an electro-optical display for displaying stitch information stored in the memory, and means for selecting the displayed stitch information, the improvement comprising:
   means for hierarchically storing, recalling and displaying menus of stitch pattern groups and stitch patterns and means for selecting stitch pattern groups and stitch patterns from the hierarchically displayed menus of stitch pattern groups and stitch patterns wherein an increased number of stitch patterns can be stored and subsequently displayed in a hierarchical manner compactly on said electro-optical display for ease of selection.

2. The sewing machine of claim 1, wherein a menu of the most frequently selected stitch patterns or stitch pattern groups is stored and displayed in a hierarchical display structure.

3. The sewing machine of claim 1, wherein a menu of selectable utility functions is stored, and wherein means are provided for selectively recalling and displaying either the menu of selectable utility functions in its entirety showing all possible utility functions or a menu which is assigned to the stitch pattern group or to the stitch pattern.

4. The sewing machine of claim 1, further comprising means for line-by-line display and selection of stitch pattern groups or stitch patterns and their respective utility symbols.

5. The sewing machine of claim 4, wherein means are provided for the individual selection and the combination of stitch patterns, e.g. letters or figures, and for the display of the combined patterns, e.g. words or numbers, on said display.

6. The sewing machine of claim 1, wherein said memory, display and selecting means are operable for simultaneously displaying a stitch or stitch patterns together with its size parameters.

7. The sewing machine of claim 1, comprising means for scrolling through and selecting menus of a stitch pattern or stitch pattern group and for displaying same.

8. The sewing machine of claim 1, comprising means for facilitating the selection of frequently used stitch types or stitch patterns.

9. The sewing machine of claim 2, wherein means are provided for selecting stitch patterns from any stitch pattern menu and storing them as a part of a menu of most commonly used stitch patterns.

10. A sewing machine comprising:
   an electro-optical display for displaying stitch pattern information;
   means for selecting a piece of said stitch pattern information from the displayed pieces of stitch pattern information; a first memory for storing basic stitch pattern menus; and a second memory for storing individual stitch pattern menus;
   a controller for hierarchically recalling said basic stitch pattern menus and said individual stitch pattern menus after selection by said selecting means and hierarchically displaying said basic stitch pattern menus and said individual stitch pattern menus on said electro-optical display thereby activating said selected piece of stitch pattern information;

means, connected to said controller, for driving a needle in accordance with said selected piece of stitch pattern information; whereby after selection of a basic stitch pattern from said basic stitch pattern menu, said controller recalls a corresponding individual stitch pattern menu from said second memory for display on said electro-optical display.

11. A sewing machine as set forth in claim 10, wherein after said selection of said basic stitch pattern at least one more specific basic stitch pattern menu is recalled and displayed prior to the recall and display of said individual stitch pattern menu.

12. A sewing machine comprising a memory, an electro-optical display for displaying stitch information stored in said memory, and means for selecting a piece of the displayed stitch information, said sewing machine further comprising:

a first section of said memory containing stitch style group information, a piece of the stitch style group information representing a stitch pattern group, a stitch type group, or a stitch type;

a second section of the memory containing stitch pattern information, each of said stitch pattern information is assigned to said piece of the stitch style group information in said first memory section;

means for alternately displaying the stitch pattern group information and the stitch pattern information on said electro-optical display, said piece of the respective displayed information being selectable by said selecting means;

means for transferring the stitch pattern information assigned to the selected piece of stitch style information, from the second section of the memory to the electro-optical display, the transferred information then being displayed by said means for displaying;

wherein an increased number of stitch patterns can be stored and alternately displayed in a hierarchical manner compactly on said display for ease of selection.

* * * * *